March 16, 1965 J. WOLLENHAUPT ETAL 3,173,308

GROOVE FIELD FOR THE CONNECTION OF CONTROL CAMS

Filed March 5, 1962 5 Sheets-Sheet 1

United States Patent Office 3,173,308
Patented Mar. 16, 1965

3,173,308
GROOVE FIELD FOR THE CONNECTION OF CONTROL CAMS
Jakob Wollenhaupt, Cologne-Bruck, Germany, and Kurt Maecker, Kreuzstrasse 34, Dusseldorf, Germany; said Wollenhaupt assignor to said Maecker
Filed Mar. 5, 1962, Ser. No. 184,624
Claims priority, application Germany, Mar. 7, 1961, M 48,294, M 48,295; Sept. 16, 1961, M 50,329
10 Claims. (Cl. 74—568)

The present invention relates to a groove field for the mounting of control cams for machine tools which are controlled by means of limit switches, and also concerns the construction of such control cams.

It is an object of the present invention to provide a groove field which can be made in a simple manner and at low cost for any desired cross section of the groove.

It is also an object of this invention to provide an improved simplified control cam which can easily be inserted and adjusted in a groove field.

These and other objects and advantages of the invention will appear more clearly from the following specification in connection with the accompanying drawings, in which.

The above outlined object has been realized according to the present invention by making the groove field of profiled rails the foot portion of which has a greater width than the head, while the rails are so arranged that the foot portions of adjacent rails contact each other.

Figure 1:
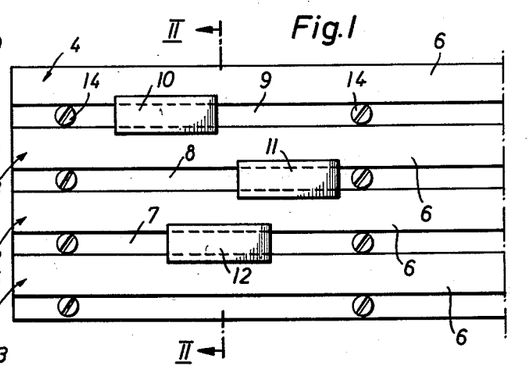
FIG. 1 is a plan view of a groove field according to the present invention.
Figure 2:
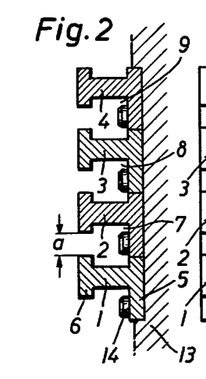
FIG. 2 illustrates a cross section through the groove field of FIG. 1 along the line II—II of FIG. 1.

Referring now to the drawings in detail and FIGS. 1 and 2 thereof in particular, the groove field illustrated therein is composed of a plurality of profiled rails 1, 2, 3 and 4, the foot portions 5 of which have a greater width than the heads 6. The profiled rails are arranged adjacent to each other in such a way that the foot portions 5 of adjacent rails contact each other. In this way, the width of the foot portions 5 determines the distance between the individual grooves 7 to 9 between the rails. The width $a$ of the free groove opening is determined by the width of the rail heads 6. By arranging profiled rails of the same cross section adjacent to each other, it will be assured that identical groove spacings and identical groove widths will be maintained. On the other hand it is, of course, also possible by selecting different rail profiles to obtain different groove shapes, groove widths and groove spacings. Furthermore, between the individual profiled rails, spacer rails may be provided so that greater groove widths and groove spacings may be obtained. On grooves 7 to 9 control cams 10 to 12 are connected. This may be effected for instance in such a way that the cams are placed upon the heads of two profiled rails while one portion of the cams or a part separate from the cams extends below the protruding portions of the rail heads 6. If this separate part is then pulled against the cam, the cam will be clamped fast to the rail heads.

Figure 3:
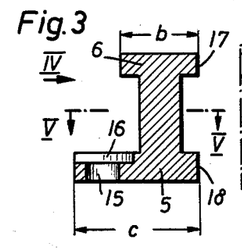
FIG. 3 is a cross section through a profiled rail of a groove field according to the invention.
Figure 4:
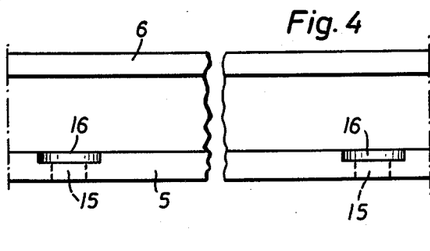
FIG. 4 shows a view of the groove field as seen in the direction of the arrow IV of FIG. 3.
Figure 5:
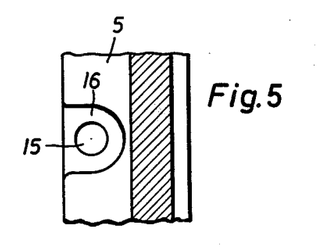
FIG. 5 is a section through the profiled rail taken along the line V—V of FIG. 3.

As has been shown in particular in FIG. 3, the profiled rails have an I-profile comprising a web with a head portion at one end and a foot portion at the other end. The foot portion 5 of the rail is advantageously lengthened on one side only with regard to the head. The connection of the rails to part 13 of the corresponding machine is advantageously effected by means of screws 14 which extend into a corresponding bore 15 of the rail foot portion. The bore 15 is advantageously provided in the wider portion of the foot because in this instance, as will be evident from FIGS. 1 and 2, the screws will be located approximately under the free groove opening and can easily be tightened or loosened from above. The bores 15 are advantageously provided with counter-sunk openings 16 for receiving the screw heads entirely or partially after the screws have been tightened. Advantageously, said counter-sunk openings have a pocket shape which is open at the free side of the foot portion 5.

As will be evident from FIG. 3, the lateral surfaces 17, 18 of rail head 6 and rail foot 5 at one side of the rail are advantageously located in one and the same plane. In this way, when producing the profiled rails, they can be ground together so that a precise reference plane will be obtained. For purposes of ascertaining the width of the groove and the spacing of the grooves, it will then merely be necessary precisely to maintain a certain width $c$ of the foot or width $b$ of the head. This can easily be effected by grinding those lateral surfaces of the rail head 6 or rail foot 5 which are located opposite the surfaces 17 and 18. Such grinding may be effected by means of a surface grinding machine until the desired surface has been obtained. The precise measurement of the groove width $a$ (FIG. 2) will be obtained by itself as soon as the rails, as mentioned above, are so arranged that the foot portions of each two adjacent rails contact each other.

The groove field according to the invention can thus be produced in a simple manner while maintaining precise measurements and spacings for the grooves.

It is also possible in conformity with the invention to produce a single groove only. To this end, only two rails are arranged adjacent to each other. It should, however, be noted that the invention is, by no means, limited to the employment of rails with I-profile but also permits a simple manufacture of groove fields with grooves of any desired profile shape. The profile of the rails is to be effected in conformity with the desired groove profile.

The control cam illustrated in FIGS. 6 to 9 is provided on a groove 112 arranged in the cam carrier, said groove widening toward the bottom thereof. To this end, cam 101, 102 has its lower side provided with a key 114 which extends into the upper free opening 115 of the groove and secures the cam against lateral displacement.

As illustrated in FIGS. 6 to 10, the cam may also advantageously consist of a base body 101 and a working body 102 held against the base body. The working body has two inclined working surfaces 104 and 105 by means of which the cam will actuate the push rod or striker of the end support.

The base body 101 of the control cam is connected to the above mentioned grove 112. To this end, by means of pins 152, 153, an arm 150 is connected to the bottom side of the cam base body 101. Said arm 150 is so long that it protrudes beyond the protrusions 110 and 111 of the downwardly widening groove 112 and extends into said widened portion of the groove. Below the protrusions 110 and 111, arm 150 has linked thereto a lever 113 by means of a pin 151. Lever 113 is according to the design of the control cam of FIGS. 6 to 9 so wide that its lateral portions 121 and 122 extend below the protrusions 110 and 111 of the grooves.

Figure 6:
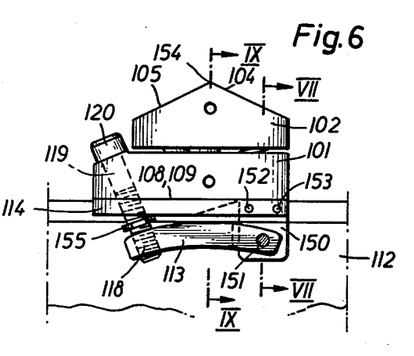
FIG. 6 is a view of a control cam according to the invention.

In contradistinction to the embodiment according to FIGS. 6 to 9, it is also possible to design lever 113 so that only a portion of its length will have the above mentioned width and, more specifically, the central portion. As is shown in FIG. 6, the tiltable lever 113 is along its entire length curved in a convex manner toward the cam 112. That end of lever 113 which is remote from its linkage point is provided wth a threaded bore 118 engaged by a screw 120 which latter extends through a preferably smooth bore 119 of the cam base body 101. By means of screws 120, the lever 113 is adapted to be pulled against the cam so that the curved upper surface of its lateral ranges 121, 122 will extend below the protrusions 110 and 111. The lateral ports 121 and 122 of lever 113 thus serve as clamping elements within the concept of the invention, because it is by means of said lateral ports 121, 122 that the cam, as mentioned, is by tightening lever 113 clamped against the protrusions 110 and 111 of the groove.

Lever 113 is preferably so curved that when being tightened by means of screw 120, it will rest against a portion below the protrusions 110 and 111 which portion is located vertically below the control tip 154 of the control cam with regard to the bearing surfaces 108 and 109 of cam 101, 102. Due to the fact that the clamping pressure acts at the said portion, a displacement of the control cam during the clamping operation and during the starting movement of the cam will be prevented. Lever 113 represents a one-arm lever. Inasmuch as the tightening force is by screw 120 conveyed to the longitudinal arm of lever 113, a considerably higher tightening force becomes effective at the clamping point. In the embodiment, the ratio of tightening force to clamping force amounts to approximately 1:2. In order to prevent too strong a tightening of the tiltable lever 113 which could bring about a deformation of said lever, screw 120 is provided with an abutment ring 155 which in the manner of a snap ring engages a corresponding groove of screw 120 and limits the movement of the screw in threaded bore 118 of lever 113.

That portion of the control cam which is located above groove 112 may, as mentioned, consist of one piece. However, advantageously, the said portion is subdivided into a working body 102 and a base body 101. This division is advantageous for several reasons. With such a division it is possible to produce the working body of a suitable synthetic material which can easily be given the desired shape. Furthermore, when employing a synthetic material, the friction and thus the control force during the control operation can be reduced and also the wear can be reduced. It is also to be noted that by clamping said cam fast, generally only a coarse adjustment of the cam is possible. Frequently, however, a fine adjustment is required which must have a precision of from 1/1000 to 1/100 of a millimeter. This fine adjustment may advantageously be effected by moving the working body of the cam in the base body in a suitable manner.

Figure 8:
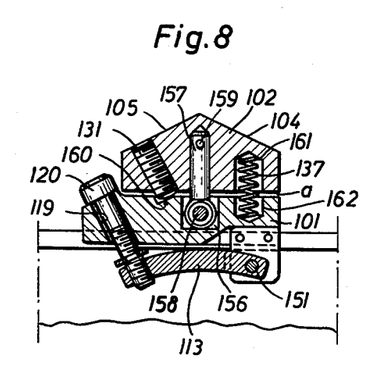
FIG. 8 is a section through the control cam according to the line VIII—VIII of FIG. 9.
Figure 9:
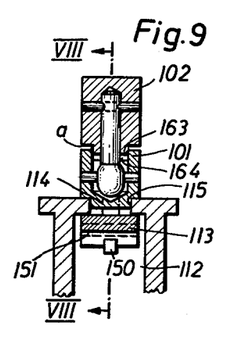
FIG. 9 shows a section through the control cam along the line IX—IX of FIG. 6.

As shown in particular in FIG. 9, the working body is by means of a key 163, arranged on its bottom side, held in a corresponding groove 164 of the base body. For purposes of fine adjustment of the working body, the latter is to be turned about an axis which is perpendicular to the plane of FIG. 8. To this end, as shown in FIGS. 8 and 9, in a recess 156 of the base body 101 a bolt 157 is by means of a pin 158 tiltable in the longitudinal direction of the control cam. Bolt 157 extends into a bore of the working body 102 and is connected thereto by means of a pin 159. The length of bolt 157 is so selected that between working body 102 and base body 101 there will prevail a certain distance $a$ which will permit a tilting of body 102 on bolt 157 about the axis of pin 158 within certain limits whereby a fine adjustment of the working body 102 will be possible.

The working body 102 of the control cam is furthermore provided with a threaded bore threadedly engaged by a screw 131 with a low pitch. The end of screw 131 acts against a pressure surface 160 of base body 101 so that when said screw is rotated, the working body 102 will be tilted relative to the base body.

The arrangement furthermore compirses a helical spring 132 mounted in bores 161 and 162 of the working body and base body respectively and acting on one hand against the working body and on the other hand against the base body. Spring 137 and screw 131 are so arranged that the tilting axis of the working body 102, which is determined by pin 158, will be located therebetween.

Furthermore, spring 137 is designed as a pressure spring. Advantageously, it exerts a force which amounts to about 20 to 50 times the occurring control forces. In this way, the spring will bring about that the screw 131 will in a position without play be pressed against the pressure surface 160 of the base body as long as a certain distance prevails between the working body and the base body. The fine adjustment of the working body 102 is so selected that, for instance, by means of a right turn of screw 131, one end of the working body will be lifted, whereas the end with spring 137 will be lowered. Thus, the working body will be turned and an adjustment of the working surfaces 104 and 105 will be effected. On the other hand, when screw 131 is turned in the left-hand direction, due to the thrust of spring 137, the working body end with spring 137 is lifted, and the other end of the working body 102 is lowered.

Also the control cam of FIGS. 10 to 13 has a base body 101' and a working body 102' arranged in the longitudinal groove 103 of the base body. With this arrangement, the working body is firmly held in the base body and by means of one or more pins 106 and 107 extending through the base body is secured against displacement. The bearing surfaces 108' and 109' of the base body rest upon the upper side of the protrusions 110' and 111' of a groove widening in downward direction. The widened space of the groove is relatively deep in order to be able to receive the tiltable lever 113' described further below.

In order to assure a safe fit of the cam base body 101', the latter has its bottom side provided with a key 114' which extends into the free opening 115' (FIG. 12) of the groove between the protrusions 110' and 111'.

A bearing arm 116 (FIG. 16) in form of a hook is by means of a screw 117 connected to one end face of the cam base body 101'. Arm 116 extends into the widened space of groove 112' and has its lower end curved in form of a hook as mentioned above. By means of this end, said arm 116 supports one end of a clamping lever 113′ which last mentioned end is likewise hook-shaped. The width of the bearing arm 116 and of the clamping lever 113′ is advantageously less than the width of the free groove opening 115′.

Figure 12:
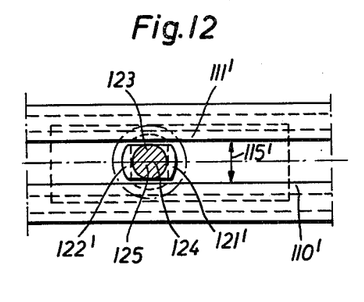
FIG. 12 is a section through the control cam of FIG. 10 taken along the line XII—XII thereof.

That end of clamping lever 113′ which is remote from said hooked-shaped end thereof is provided with a threaded bore 118′ threadedly engaged by a head screw 120′ extending through a bore 119′ of the cam base body. By means of this head screw 120′, the clamping lever 113′ can be pulled against the base body. In order in this connection to make possible the clamping of the cam in the groove, clamping elements are provided which are designed as lateral protrusions 121′, 122′ at the lower portion of a separate clamping body 123 which is rotatable about its vertical longitudinal axis in the free opening 115′ of groove 112′. Within the range of the clamping elements, the clamping body 123 has perpendicular to the connecting axis 124 (FIG. 12) less width than the free groove opening 115′. Above the clamping elements, the clamping body 123 has a cylindrical shank 125 the diameter of which is likewise less than the width of the free groove opening 115′. When the clamping body 123 is so adjusted that the connecting axis 124 of the clamping elements 121′, 122′ points in the longitudinal direction of the groove, the control cam can be inserted into the groove from above. Thereupon, the clamping body is turned by 90° so that the clamping elements 121′, 122′ will catch below the protrusions 110′ and 111′ of the groove. This position of the clamping body 123 is illustrated in FIG. 12 by dash lines. Advantageously, the head 126 of the clamping body 123 is provided with a marking 127 which indicates the position of the clamping elements 121′, 122′.

When the clamping elements 121′, 122′ catch below the protrusions of the widened groove, the clamping lever 113′ is tightened by means of the head screw 120′ whereby the control cam is clamped fast on groove 112′. In order to make sure that during this operation no displacement of the control cam will occur, the clamping body 123 with the clamping elements 121′, 122′ is so arranged that following the clamping with regard to the bearing 108′ and 109′ of the cam, the clamping body 123 will be vertically below the frustrated point of the cam. In order to assure this position, the clamping body 123 is of conical shape below the clamping elements 121′, 122′, and is mounted in a corresponding conical recess of the clamping lever 113′. Furthermore, the lower end of the clamping body 123 is provided with a centering point 128 which likewise extends into a corresponding bore of the clamping lever 113′.

Figure 10:
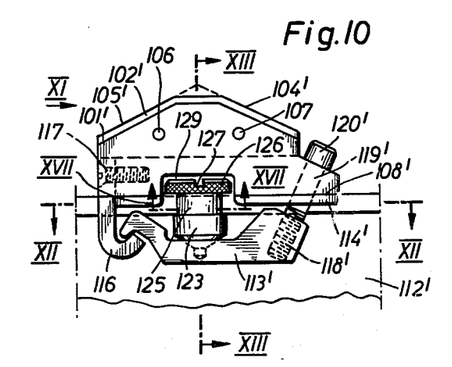
FIG. 10 is a side view of a modified control cam according to the invention.
Figure 11:
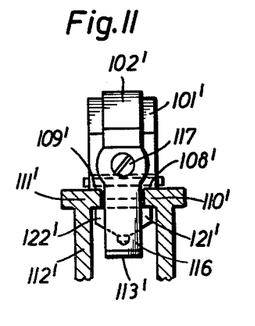
FIG. 11 is an end view of the control cam of FIG. 10 as seen in the direction of the arrow XI.
Figure 13:
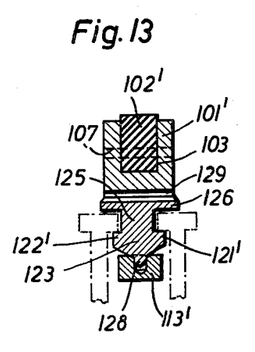
FIG. 13 is a section through the control cam taken along the line XIII—XIII of FIG. 10.
Figures 15, 17:
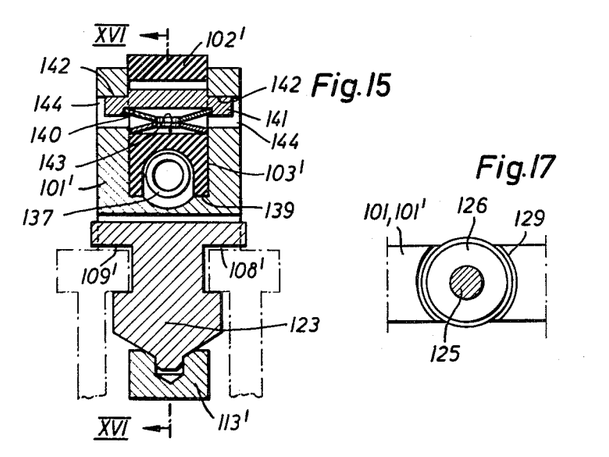
FIG. 15 is a section through the control cam taken along the line XV—XV of FIG. 14 but on a larger scale than FIG. 14.
FIG. 17 shows a section through a portion of the control cam, said section being taken along the line XVII—XVII of FIGS. 10 and 14.

As FIGS. 10, 11 and 13 indicate, the head 126 of the clamping body 123 extends into a corresponding recess 129 of the cam base body 101′. This recess may, as indicated in FIG. 17, when viewed in plan view, be circular and may surround head 126 with a slight play. The said recess will in this way give the clamping body 123 a certain lateral hold. By means of this hold or bearing arrangement and by means of screw 120′, the position of the clamping lever 113′ with regard to the cam base body 101′ is sufficiently precisely determined so that a further securing, for instance by pins or the like, will be superfluous.

FIGS. 14 to 17 show a further embodiment of a control cam according to the invention. This cam is clamped to the widening groove in the same manner as described in connection with FIGS. 10 to 13. The elements employed to this effect, therefore, are in FIGS. 14 to 17 provided with the same reference numerals as in FIGS. 10 to 13.

As mentioned above, by the clamping operation, only a relatively coarse possibility of adjustment is obtained. If this degree of precision is not sufficient, a further adjustment is required. FIGS. 14 to 17 illustrate the necessary means to this effect.

A head screw 131′ with low pitch extends through a bore 130′ in the base body 101′. Screw 131′ has a nut 132 at its free end, which nut is displaceable in longitudinal direction of the screw but is non-rotatably guided in the base body. The nut 132 engages the long lever arm 133′ of a lever tiltably mounted in the base body by means of a pin 134. The shorter lever arm 135 of the last mentioned lever acts against a nose 136 of the working body 102′ which is displaceable in groove 103′. In opposite direction, a spring 130′ acts upon nose 135. The thrust of said spring corresponds approximately to from 20 to 50 times that of the forces occurring during the control operation. Spring 137′ has its other end resting against a nose 138 of the base body 101′. The said spring thus presses the working body against the tiltable lever 133′, 135 and due to its strong thrust brings about that during the control operation no displacement of the working body will occur. Moreover, the said spring also brings about that during the adjustment of the working body 102′ by means of tiltable lever 133′, 135, nut 132 and micrometer screw 131′, no play will be noticeable.

The adjustment is effected in such a way that the nut 132 is lifted or lowered by means of screw 131′. As a result thereof, lever 133′, 135 is tilted so that the working body, depending on the direction of rotation of screw 131′, is pressed against spring 137′, or by means of spring 137′ is moved against the receding lever 133′, 135.

Figure 14:
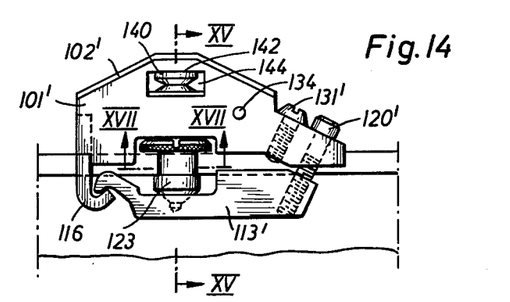
FIG. 14 is a side view of still another modified control cam according to the invention.

In contradistinction to the embodiment of FIGS. 14 and 15, it is also possible to cause screw 131′ directly to act upon working body 102′. In this instance, advantageously the corresponding bore in the base body forms a threaded bore through which the micrometer screw is guided. It is, however, also possible to provide a corresponding threaded bore in the working body 102′, and to cause the screw to act against a pressure surface of the base body 101′.

Figure 7:
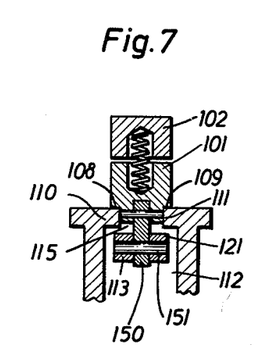
FIG. 7 is a section through the control cam of FIG. 6 along the line VII—VII thereof.

Furthermore, as described in connection with FIGS. 7 to 9, it is also possible to bring about the fine adjustment of the working body not by displacing the same in the base body, but by a tilting movement about an axis which is perpendicular to the drawing plane of FIG. 8.

Advantageously, the working body 102′ is secured against displacement by forces acting perpendicular to the bearing surface 108′, 109′. To this end, as shown in particular in FIG. 16, a spring 140 is provided which is arranged in the working body 102′. The upper end of said spring rests through a spring dish 141 against a downwardly pointing surface 142 of the base body 101′, whereas the lower end of the spring rests against an upwardly pointing surface 143 of the working body 102′. In this way, the working body 102′ is firmly pressed downwardly against the bottom surface 139 of groove 103′. The thrust of spring 140 is advantageously selected considerably higher than the force components which during the control operation act perpendicularly with regard to the surface 139. According to the embodiment shown in the drawing, spring 140 is designed as plate spring. However, any other spring, as for instance a helical spring, may be employed.

Figure 16:
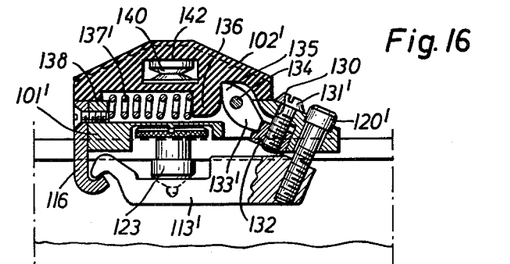
FIG. 16 is a section through the control cam according to the line XVI—XVI of FIG. 15.

In the embodiment shown in the drawing, the downwardly pointing surface 142 of the base body 101′ simultaneously forms the upper surface of a recess 144 in the base body. This recess is in the longitudinal direction of groove 103′ designed so long that it offers sufficient play for the displacement of the working body 102′ when the latter is finely adjusted. The spring dish 141 will during the displacement slide on the surface 142′ designed as sliding surface, whereas spring 140 will be held fast on surface 143 during said displacement.

It is to be understood that also the reverse arrangement is possible inasmuch as the spring may slide on the surface 143. In this instance, surface 142 does not require any play for a displacement of the working body 102'. Finally, also the two surfaces 142 and 143 may be designed as sliding surfaces in order to allow a displacement of the working body.

As has been described with reference to FIGS. 6 and 9, the clamping elements 121 and 122 may be arranged directly laterally of the clamping lever 113. In this instance, however, it is not possible to place the control cam with clamping lever at random positions into the downwardly widening groove. This has rather to be effected at the end of the groove or the places with corresponding recesses for the clamping elements 121 and 122.

It is, of course, to be understood that the present invention is, by no means, limited to the particular constructions shown in the drawings but also comprises any modifications within the scope of the appended claims.

Figure 18:
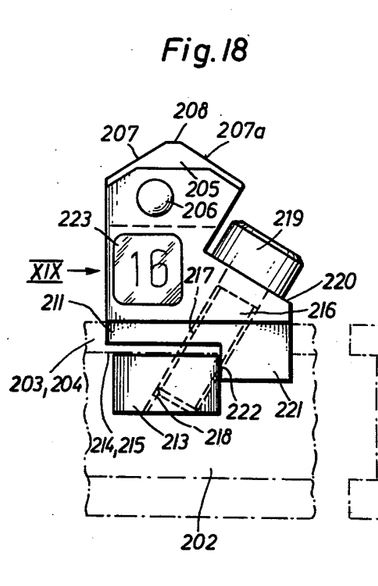
FIG. 18 shows a side view of a special version of the invention.
Figure 19:
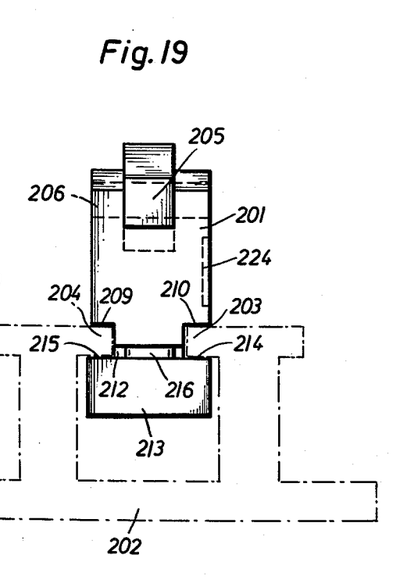
FIG. 19 shows the front view of the cam illustrated in FIG. 18, in the direction of arrow II.

In the version depicted in FIGURES 18 and 19 a clamping body is provided at the bottom of the cam; this clamping body is sufficiently wide to enable it to engage on both sides under the projections of the groove, and that a screw inserted from above, through an oblique hole in the cam, can be screwed into a tapped hole in the clamping body. The threads and hole are so arranged that, in the clamped position, the thread is approximately vertical under the top point of the cam.

By this means, when the cam is secured in position, the clamping pressure is approximately vertical under the top point of the cam, upon which the maximum operating forces act. As a result thereof, an absolutely positive seating of the cam is ensured, upon which the dependability and the accuracy of the control motion depend.

In a special version of the invention the cam has a projection on its base, which is so arranged that, in the clamped position the clamping body is pressed against the projection of the cam and against the projections of the grooves by the screw. When the cam is clamped in position the forces acting in the longitudinal direction, that is in the working direction, are accommodated by the cam's projection. Therefore, only those forces that are mainly in the vertical to the bearing surfaces of the clamping body and of the projections are determinate for the clamping operation. The cam cannot become displaced, because forces that could cause displacement during the clamping operation are eliminated. The setting is thus considerably simplified.

In FIGS. 18 and 19 the cam 201 is fixed in position in a groove 202. The groove 202 has a wider cross-section at the base. The narrow section at the top is formed by projections 203 and 204 on either side, to which the cam 201 is clamped in position.

In its upper part the cam is provided with a groove with access from above, in which a body element 205, of a wear-resistant material, such as plastics, is inserted. The body element 205 is provided with oblique actuating surfaces 206 and 207 for the push-rod of the limit switch, which converge at the point of the cam 208. The body element 205 is retained in the cam 201 with the aid of a pin 206.

The cam 201 rests with its bearing surfaces 209 and 210 on the external surface of groove 202. With the aid of a key arranged in the longitudinal along its base, and which fits in the upper section 212 of the groove 202, it is prevented from twisting and is afforded longitudinal guidance.

At the base of the cam 201 there is provided a clamping body 213, which is designed sufficiently wide to permit the sides to engage on the downward directed clamping surfaces 214 and 215 of the projections 203 and 204.

To tighten the clamping body 213, that is to say, to secure the cam in position, a round head screw 216 is provided, which is inserted in hole 217 of the cam and engages in a tapped hole 218 of clamping body 213. The head 219 of screw 216 is in contact with surface 220 of cam 201, vertical to the centre line of hole 217. Hole 217 in cam 201 and tapped hole 218 in clamping body 213 are so located that, in the clamped position, tapped hole 218 is in a vertical line with the top point of cam 208. As a result thereof, absolutely positive seating of the cam is ensured.

As in the control of production machines extreme accuracy is frequently called for, which by way of example can be 0.01 mm., the accurate positioning of the cam is of considerable importance. In order not to alter the precise position of the cam, even when tightening it, the cam, in accordance with the invention, is provided at the base with a projection 221, which mates with groove 202.

As FIGURE 18 illustrates, the projection is so arranged that the clamping body 213 of the cam in the clamped position is simultaneously pressed by screw 216 against the projection 221 of the cam and against projections 203 and 204 of the groove. In order to make this possible, the projection must be dimensioned to suit the thickness of the groove projections 203 and 204. When the clamping body 213 is bearing on the projection 221 of the cam, the forces acting in the longitudinal direction of the cam, that is in the direction of movement, are accommodated by the projection 221, so that these forces cannot cause displacement of the cam during the clamping operation. In the cam illustrated in the drawing, this is achieved in a particularly effective manner in that the tensioning surface 222 of the projection 221 is vertical to the clamping surfaces 214 and 215 of the groove projections 203 and 204. Thus, the forces occurring when clamping are in effect exerted on projections 203 and 204 of cam 202, which are mainly in the vertical to clamping surfaces 214 and 215, so that there can be no displacement of the cam.

Every cam can be provided with an identification plate, such as number plate 223, for example, in order to provide particularly good facility of inspection. The identification plate 223 can be fitted in a recess 224 in the cam and, by way of example, this is 0.5 mm. deep.

What we claim is:

1. A cam for mounting in a stepped groove formed in a member and extending inwardly from a wall of the member, said groove having a first narrower portion adjacent said wall and a second wider portion remote from said wall, said groove having confining wall portions extending longitudinally of the groove; said cam comprising body means wider than said first portion of the groove and including a tongue-like portion projecting from the body means and insertable into the outer end of said first portion of the groove, lever means pivotally connected to said cam body means, means on said lever means wider than said first portion of the groove and disposed in said second portion of the groove, and means operatively connected to said cam body means and to said lever means and operable to pull said lever means toward said cam body means for clamping said lever means against the wall portions of the groove which are disposed on opposite sides of the inner end of said first portion of the groove while simultaneously clamping said cam body means to said wall of said member, said body means having a zenith portion on the side thereof remote from said member, said lever means engaging the said wall portions substantially opposite said zenith portion.

2. A cam for mounting in a stepped groove formed in a member and extending inwardly from a wall of the member, said groove having a first narrower portion adjacent said wall and a second wider portion remote from said wall, said groove having confining wall portions extending longitudinally of the groove; said cam comprising body means wider than said first portion of the groove and including a tongue-like portion projecting from the body means and insertable into the outer end of said first portion of the groove, lever means pivotally connected to said cam body means, means on said lever means wider than said first portion of the groove and disposed in said second portion of the groove, and means operatively connected to said cam body means and to said lever means and operable to pull said lever means toward said cam body means for clamping said lever means against the wall portions of the groove which are disposed on opposite sides of the inner end of said first portion of the groove while simultaneously clamping said cam body means to said wall of said member, said body means having a zenith portion on the side thereof remote from said member, said lever means engaging the said wall portions substantially opposite said zenith portion, said lever means being curved so as to be convex toward the cam body means.

3. A cam for mounting in a stepped groove formed in a member and extending inwardly from a wall of the member, said groove having a first narrower portion adjacent said wall and a second wider portion remote from said wall, said groove having confining wall portions extending longitudinally of the groove; said cam comprising body means wider than said first portion of the groove and including a tongue-like portion projecting from the body means and insertable into the outer end of said first portion of the groove, lever means pivotally connected to said cam body means, means on said lever means wider than said first portion of the groove and disposed in said second portion of the groove, and means operatively connected to said cam body means and to said lever means and operable to pull said lever means toward said cam body means for clamping said lever means against the wall portions of the groove which are disposed on opposite sides of the inner end of said first portion of the groove while simultaneously clamping said cam body means to said wall of said member, said body means having a zenith portion on the side thereof remote from said member, said lever means engaging the said wall portions substantially opposite said zenith portion, said means on said lever means comprising a clamping member having a first section wider than said first portion of the groove and disposed in said second portion of the groove between the lever means and said first portion of the groove, said clamping member also having a head portion wider than said first portion of the groove disposed outside the groove and connected to said first section, said body means including a recess receiving said head portion.

4. A cam for mounting in a stepped groove formed in a member and extending inwardly from a wall of the member, said groove having a first narrower portion adjacent said wall and a second wider portion remote from said wall, said groove having confining wall portions extending longitudinally of the groove; said cam comprising body means wider than said first portion of the groove and including a tongue-like portion projecting from the body means and insertable into the outer end of said first portion of the groove, lever means pivotally connected to said cam body means, means on said lever means wider than said first portion of the groove and disposed in said second portion of the groove, and means operatively connected to said cam body means and to said lever means and operable to pull said lever means toward said cam body means for clamping said lever means against the wall portions of the groove which are disposed on opposite sides of the inner end of said first portion of the groove while simultaneously clamping said cam body means to said wall of said member, said body means having a zenith portion on the side thereof remote from said member, said lever means engaging the said wall portions substantially opposite said zenith portion, said cam body means including a base portion adjacent said member and a working body portion mounted on the base portion on the side thereof remote from said member, said lever means being connected to said base portion.

5. A cam according to claim 4 in which said working body portion is pivotally connected to said base portion, a spring between said body portion and base portion on one side of the said pivotal connection therebetween, and adjusting screw means threaded into said body portion and abutting said base portion on the other side of said pivotal connection, said spring developing a thrust of from about 20 to 50 times the force acting on said body portion during operation of said cam.

6. A cam for insertion into a T shaped groove, especially of machine tools, which includes: a working cam body and a cam base body, said cam base body being wider than the narrower portion of said groove and including a portion insertable into the narrower portion of the groove, said cam base body having a recess receiving said working cam body, lever means having one end portion thereof linked to said portion of said cam base body at one side of said cam base body for tilting relative thereto, adjustable means extending through said cam base body and engaging the other end of said lever means, a clamping member interposed between said lever means and said cam base body and provided with clamping sections wider than the narrower portions of the groove in which the cam is to be inserted, additional lever means pivotally supported by said cam base body and having a shorter arm engaging said working cam body and having a longer arm including a threaded section, screw means with a fine pitch adjustably engaging said threaded section, spring means interposed between said cam base body and said working cam body and continuously urging the latter into engagement with said shorter arm, and supporting means engaging said cam base body and including other spring means having one end thereof resting against a downwardly facing surface of said supporting means and having its other end resting against an upwardly facing surface of said working cam body.

7. A groove field for the connection of control cams thereto, especially for use in connection with limit switch controlled machine tools, which includes a plurality of profiled rails arranged in parallel side by side relation, each of said rails having an I-shaped cross section, comprising a web with a head portion at one end and a foot portion at the other end, said foot portion being wider than said head portion, the foot portions of adjacent rails engaging each other, the foot portion and the head portion on one end and the same side of said web having the lateral outer edges thereof flush with each other, and the foot portion on the other side of said web laterally protruding beyond the end of the head portion on the same side of said web.

8. A groove field for the connection of control cams thereto, especially for use in connection with limit switch controlled machine tools, which includes a plurality of profiled rails arranged in parallel side by side relation, each of said rails having an I-shaped cross section, comprising a web with a head portion at one end and a foot portion at the other end, said foot portion being wider than said head portion, the foot portions of adjacent rails engaging each other, the foot portion and the head portion on one and the same side of said web having the lateral outer edges thereof flush with each other, and the foot portion on the other side of said web laterally protruding beyond the end of the head portion on the same side of said web, said foot portion on said other side of said web being provided with passage means for connecting screws, said passage means including countersunk portions open toward the side of the foot portion to which the web is attached.

9. A cam having a zenith portion and adapted for insertion into a groove, especially of machine tools, said groove having a narrower mouth portion and a wider base portion, said cam comprising a clamping body receivable in said groove base portion and wider than said groove mouth portion, said cam and body being provided with oblique aligned holes and the hole in said body being threaded, and a screw inserted through the oblique hole of the cam and threadedly engaging the oblique hole in the clamping body, the holes being so arranged that, in the clamped position, the portion of the screw threaded into the clamping body is approximately co-planar with the zenith portion of the cam in a plane substantially normal to the direction of the length of said groove.

10. A cam according to claim 9, in which the cam has a projection extending into said narrower mouth portion of the groove adapted to engage the clamping body and so arranged that, in the clamped position the clamping body is simultaneously pressed by the screw against the projection and also toward the cam.

References Cited by the Examiner
UNITED STATES PATENTS

| | | | |
|---|---|---|---|
| 2,483,712 | 10/49 | Schafer | 188—43 |
| 3,012,304 | 12/61 | Hawkins | 188—43 |

FOREIGN PATENTS 1,148,904  7/57  France.

BROUGHTON G. DURHAM, *Primary Examiner.*